(12) United States Patent
Blundell et al.

(10) Patent No.: US 9,733,130 B2
(45) Date of Patent: Aug. 15, 2017

(54) TEMPERATURE SENSOR BELT

(71) Applicant: ILLINOIS TOOL WORKS INC., Glenview, IL (US)

(72) Inventors: Jack Robert Blundell, Houston, TX (US); Paul David Verhagen, Appleton, WI (US); Adolph G. Galinski, Glenview, IL (US); Anders Olof Rostlund, Chicago, IL (US); Christopher J. Nelli, Schaumburg, IL (US); Scott Stephen Liebert, Freedom, WI (US); Kevin John Mlnarik, De Pere, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 470 days.

(21) Appl. No.: 14/258,987

(22) Filed: Apr. 22, 2014

(65) Prior Publication Data

US 2014/0334517 A1  Nov. 13, 2014

Related U.S. Application Data

(60) Provisional application No. 61/821,959, filed on May 10, 2013.

(51) Int. Cl.
*G01K 1/14* (2006.01)

(52) U.S. Cl.
CPC .................................... *G01K 1/143* (2013.01)

(58) Field of Classification Search
CPC  G01K 1/143; G01K 1/04; G01K 1/06; G01K 2003/145

USPC ......................................................... 374/111
See application file for complete search history.

(56) References Cited

U.S. PATENT DOCUMENTS

| 2,737,050 | A | * | 3/1956 | Moninger | G01K 1/143 374/147 |
| 3,983,753 | A | * | 10/1976 | Greenleaf | G01K 13/002 374/208 |
| 4,553,432 | A | * | 11/1985 | Barlian | G01K 1/143 219/505 |

(Continued)

FOREIGN PATENT DOCUMENTS

| DE | 3126931 | 2/1983 |
| DE | 102009003848 | 11/2010 |

(Continued)

OTHER PUBLICATIONS

International Search Report from PCT application No. PCT/US2014/036170, dated Sep. 1, 2014, 11 pgs.

*Primary Examiner* — Minh Phan
*Assistant Examiner* — Leon W Rhodes, Jr.
(74) *Attorney, Agent, or Firm* — Fletcher Yoder P.C.

(57) ABSTRACT

A temperature sensor belt includes at least one temperature sensor. The at least one temperature sensor is configured to provide an indication representative of a temperature of a workpiece. The temperature sensor belt also includes a support material disposed over the at least one temperature sensor. The support material is configured to support the at least one temperature sensor on the sensor belt. The temperature sensor belt also includes an insulative material at least partially surrounding the at least one temperature sensor. The insulative material is configured to thermally insulate the at least one temperature sensor.

20 Claims, 3 Drawing Sheets

(56) References Cited

U.S. PATENT DOCUMENTS

| | | | | |
|---|---|---|---|---|
| 4,569,355 A * | 2/1986 | Bitterly | .................. | A61B 5/441 |
| | | | | 600/504 |
| 4,699,519 A * | 10/1987 | Persson | .................. | G01K 3/005 |
| | | | | 340/519 |
| 5,255,979 A * | 10/1993 | Ferrari | .................... | G01K 1/083 |
| | | | | 206/306 |
| 6,491,647 B1 * | 12/2002 | Bridger | .................. | A61B 5/021 |
| | | | | 128/900 |
| 6,834,556 B2 * | 12/2004 | Cain | .................... | G01M 3/002 |
| | | | | 73/861.24 |
| 7,780,357 B2 * | 8/2010 | Varonis | .................... | G01P 3/443 |
| | | | | 324/178 |
| 8,894,584 B2 * | 11/2014 | Swoboda | .................. | A61B 5/01 |
| | | | | 600/549 |
| 9,341,535 B2 * | 5/2016 | Gardner | .................. | G01L 19/08 |
| 2009/0232183 A1 * | 9/2009 | Salem | ................ | G01K 11/3206 |
| | | | | 374/161 |
| 2011/0264399 A1 * | 10/2011 | Thayer | .................. | F16L 59/168 |
| | | | | 702/136 |
| 2013/0085553 A1 * | 4/2013 | Kang | ................ | A61N 1/36014 |
| | | | | 607/100 |
| 2014/0161151 A1 * | 6/2014 | Proctor | .................. | G01K 13/02 |
| | | | | 374/147 |
| 2014/0299595 A1 * | 10/2014 | Sherrill | .................... | H05B 6/06 |
| | | | | 219/676 |

FOREIGN PATENT DOCUMENTS

| | | | |
|---|---|---|---|
| FR | 2561382 | | 9/1985 |
| FR | 2833346 | | 6/2003 |
| JP | 2000205967 A | * | 7/2000 |
| JP | 2011209190 A | * | 10/2011 |

* cited by examiner

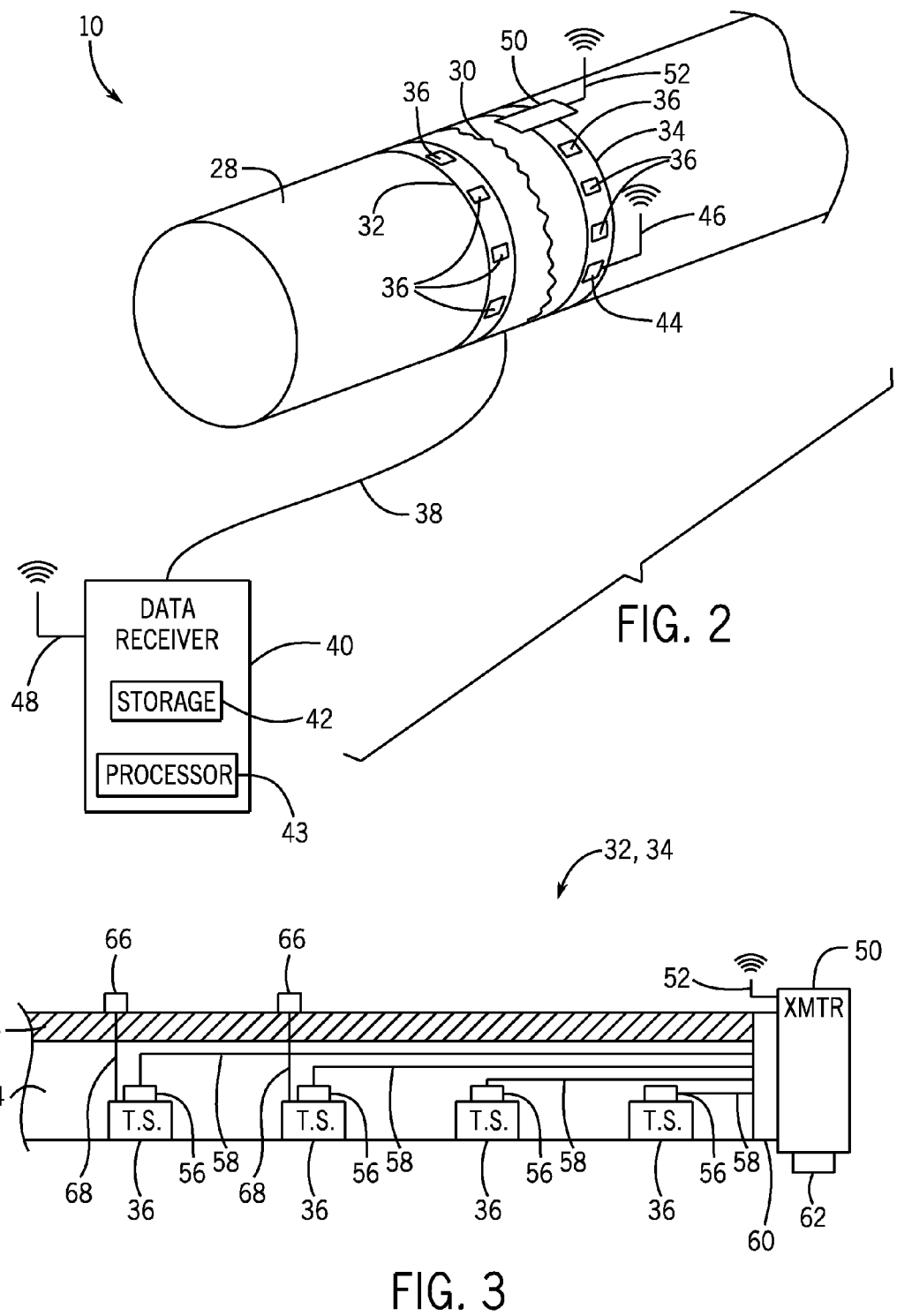

TEMPERATURE SENSOR BELT

This application is a Non provisional Patent Application of U.S. Provisional Patent Application No. 61/821,959, entitled "TEMPERATURE SENSOR BELT", filed May 10, 2013, which is incorporated herein by reference in its entirety.

BACKGROUND

The invention relates generally to temperature sensors and, more particularly, to a temperature sensor belt that may be used during a welding operation.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

Welding operations are performed on a variety of different materials. For example, a workpiece may be formed from a carbon steel or a corrosion resistant alloy, such as stainless steel. Certain workpieces may be sensitive to heat, such as heat produced during a welding operation. Accordingly, a quality of a weld on a workpiece may depend on temperatures that the workpiece is exposed to during the welding operation. Unfortunately, it may be difficult to detect the temperature of a workpiece near a joint while a welding operation is occurring on the joint. Thus, it may be difficult to determine temperatures that a workpiece is exposed to during the welding operation.

BRIEF DESCRIPTION

In one embodiment, a temperature sensor belt includes at least one temperature sensor. The temperature sensor is configured to provide an indication representative of a temperature of a workpiece. The temperature sensor belt also includes a support material disposed over the at least one temperature sensor. The support material is configured to support the at least one temperature sensors on the sensor belt. The temperature sensor belt also includes an insulative material at least partially surrounding the at least one temperature sensor, wherein the insulative material is configured to thermally insulate the at least one temperature sensor.

In another embodiment, a temperature sensor belt includes a plurality of temperature sensors. Each temperature sensor is configured to provide an indication representative of a temperature. The temperature sensor belt also includes a first layer having an insulative material, wherein the first layer at least partially thermally insulates the plurality of temperature sensors. Additionally, the temperature sensor belt includes a second layer having a protective material, wherein the first layer is disposed between the plurality of temperature sensors and the second layer.

In a further embodiment, a temperature sensor belt includes one or more temperature sensors configured to detect temperatures on a surface of a workpiece. The temperature sensor belt also includes a strap having a support material disposed over the one or more temperature sensors. The support material is configured to support the one or more temperature sensors.

DRAWINGS

These and other features, aspects, and advantages of the present invention will become better understood when the following detailed description is read with reference to the accompanying drawings in which like characters represent like parts throughout the drawings, wherein:

FIG. 2 is an illustration of an embodiment of a welding system having a temperature sensor belt, in accordance with aspects of the present disclosure;

FIG. 3 is a cross-sectional view of an embodiment of a temperature sensor belt, in accordance with aspects of the present disclosure;

DETAILED DESCRIPTION

Figure 1:
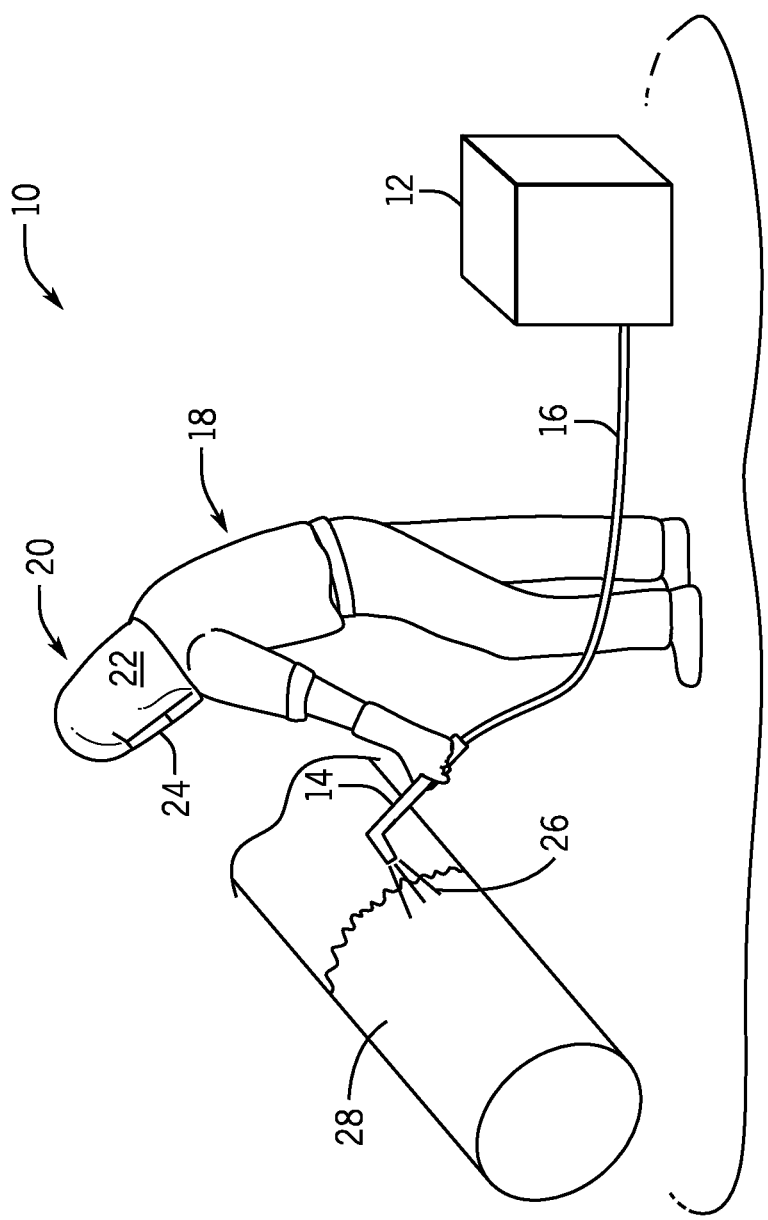
FIG. 1 is an illustration of an embodiment of a welding system including a workpiece that may be formed from a carbon steel or a corrosion resistant alloy, in accordance with aspects of the present disclosure.

Embodiments of the present invention may be used in any application where one or more temperatures may be detected. For example, FIG. 1 illustrates an arc welding system 10. As depicted, the arc welding system 10 may include a power supply 12 that generates and supplies welding power to an electrode 14 via a conduit 16. In the arc welding system 10, a direct current (DC) or alternating current (AC) may be used along with the consumable or non-consumable electrode 14 to deliver current to the point of welding. In such a welding system 10, an operator 18 may control the location and operation of the electrode 14 by positioning the electrode 14 and triggering the starting and stopping of the current flow. As illustrated, a helmet assembly 20 is worn by the welding operator 18. The helmet assembly 20 includes a helmet shell 22 and a lens assembly 24 that may be darkened to prevent or limit exposure to the light generated by a welding arc 26.

When the operator 18 begins the welding operation (or other operation such as plasma cutting) by applying power from the power supply 12 to the electrode 14, the welding arc 26 is developed between the electrode 14 and a workpiece 28, such as the illustrated pipe. The workpiece 28 may be formed from a carbon steel or a corrosion resistant alloy, such as stainless steel, or other metals and alloys (e.g., aluminum, titanium, zirconium, niobium, tantalum, nickel alloys). Non-metal (e.g., plastic, polymeric, rubber) workpieces 28 may also be welded or otherwise joined, for example, by stir welding.

Generally, the techniques described herein enable certain operations (e.g., welding, cutting, grinding, induction heating, testing) to be performed on the workpiece 28 by applying power supplied by the power supply 12. The workpiece 28 may be disposed in an industrial facility (e.g., industrial plant, shipyard) but may also be disposed in a residential facility, such as a garage or a home. The workpiece 28 may include tubular pieces (e.g., pipe), flat sheeting (e.g., metal or plastic sheets and plates), angled workpieces 28 (e.g., angle iron) or any other piece that may be welded, cut, ground, induction heated, or tested, for example, by using power delivered via the power supply 12.

The electrode 14 and the conduit 16 thus deliver current and voltage sufficient to create the welding arc 26 between the electrode 14 and the work piece 28. The welding arc 26 melts the metal (the base material and any filler material added) at the point of welding between the electrode 14 and the work piece 28, thereby providing a joint when the metal cools. The welding system 10 may be configured to form a weld joint by any suitable technique, including shielded metal arc welding (SMAW) (i.e., stick welding), gas tungsten arc welding (GTAW), gas metal arc welding (GMAW), flux-cored arc welding (FCAW), metal inert gas welding (MIG), tungsten inert gas welding (TIG), gas welding (e.g., oxyacetylene welding), sub-arc welding (SAW), and/or resistance welding. As may be appreciated, shielding gas may be used in certain applications, such as GTAW, GMAW, and FCAW, for example. Waveforms used during welding may include regulated metal deposition (RMD) type waveforms, among others, surface tension transfer (STT), cold metal transfer (CMT).

As described below, heat applied to the workpiece 28 may be detected (e.g., sensed) using a temperature sensor belt. By using the temperature sensor belt, temperatures of the workpiece 28 near a welding application may be detected and/or monitored to determine a quality of a welding operation and/or to control temperature of a welding operation being performed. As may be appreciated, such a temperature sensor belt may be used in any application where temperature detection is desired, such as welding, cutting, grinding, induction heating, testing, and so forth.

FIG. 2 is an illustration of an embodiment of the welding system 10 having a temperature sensor belt. The workpiece 28 has a joint 30 where joining (e.g., welding) is to be performed. A temperature sensor belt 32 is positioned adjacent to the joint 30 to detect one or more temperatures of the workpiece 28 before, during, and/or after the joint 30 is welded. For example, the temperature sensor belt 32 may be positioned within one to four inches from the joint 30, in certain embodiments. A second temperature sensor belt 34 is positioned adjacent to the joint 30, on an opposite side of the joint 30 relative to the temperature sensor belt 32. As may be appreciated, the temperature sensor belts 32 and 34 are substantially identical. While two temperature sensor belts 32 and 34 are illustrated, the welding system 10 may include 1, 2, 3, 4, 5, or more temperature sensor belts. Moreover, in some embodiments, two or more temperature sensor belts may be adjacent to one another on one side of the joint 30. The temperature sensor belts 32 and 34 may be formed from any suitable material that enables the belts 32 and 34 to wrap around (e.g., surround the external surface of) the workpiece 28, such as an elastic material, a flexible material, a heat resistant material, a cloth, a material having hook and loop fasteners (e.g., Velcro™), and so forth. While the workpiece 28 has a circular external surface in the illustrated embodiment, in other embodiments, the workpiece 28 may have an external surface that is triangular, square, rectangular, flat, or any other standard or non-standard shape of exterior surface. As may be appreciated, two or more temperature sensor belts 32 and 34 may be connected in any suitable configuration to enable temperature measurements of any shape joint 30. For example, two or more temperature sensor belts 32 and 34 may be connected together serially.

The temperature sensor belts 32, 34 include temperature sensors 36 attached to, installed in, installed on, and/or otherwise coupled thereto. The temperature sensors 36 may be attached to the temperature sensor belts 32, 34 so that the temperature sensors 36 contact the surface of the workpiece 28 (e.g., exterior surface, interior surface, or the temperature sensors may detect a temperature via conduction with the temperature sensor belts 32, 34. In certain embodiments, the temperature sensors 36 may detect a temperature without contacting the surface of the workpiece 28. The temperature sensors 36 may be any suitable devices that can provide indications that correspond to temperatures. For example, one or more of the temperature sensors 36 may be a thermocouple, a bimetallic switch, a resistance temperature detector (RTD), a thermistor, a wax motor (e.g., actuator device suitable for converting thermal-to-mechanical energy via phase change behavior of waxes), and/or an infrared sensor. The indication representative of a temperature of the workpiece 28 may include a signal, such as a voltage signal, a current signal, a wireless, signal, a magnetic signal and so on. The indication may additionally or alternatively be a data packet or packets, or other indications that may include numbers, text, or a combination thereof.

As illustrated, the temperature sensors 36 are configured to communicate with another device by using a cable 38. Moreover, in other embodiments, the temperature sensors 36 may provide indications (e.g., data or signals) that correspond to temperatures using wired and/or wireless communication. A data receiver 40 may receive the indications from the temperature sensors 36 via the cable 38. The data receiver 40 may be a stand alone device, or may be incorporated into a computer system, welding power supply (e.g., the power supply 12 illustrated in FIG. 1), or any suitable device, including cloud-based devices (e.g., servers accessible as cloud-based services). In certain embodiments, the data receiver 40 may include one or more storage devices 42 for storing the indications from the temperature sensors 36. The one or more storage devices 42 (e.g., nonvolatile storage) may include ROM, flash memory, a hard drive, or any other suitable optical, magnetic, or solid-state storage medium, or a combination thereof. The one or more storage devices 42 may store data (e.g., indications from the temperature sensors 36, temperature data, etc.), instructions (e.g., software or firmware for determining temperatures, etc.), and any other suitable data. In certain embodiments, the data receiver 40 may include one or more processors 43 for processing the indications from the temperature sensors 36, such as for converting indications to temperature data. Moreover, in some embodiments, the data receiver 40 may receive the indications from the temperature sensors 36 and may provide the indications to another device, without storing the indications. For example, the data receiver 40 may function as a pass-through device where the indications from the temperature sensors 36 are provided to a network device, a storage device, a server, and/or any other suitable device for storage and/or processing (e.g., an Internet server, Cloud storage, etc.).

Furthermore, in certain embodiments, the temperature sensor belts 32, 34 may also include one or more temperature sensors 44 configured to communicate using wireless signals 46. Moreover, the data receiver 40 may be configured to receive wireless signals 48 for storing and/or processing the indications from the wireless temperature sensor 44. As may be appreciated, the wireless temperature sensor 44 may be a thermocouple, a bimetallic switch, a resistance temperature detector (RTD), a thermistor, a wax motor, and/or an infrared sensor, with a wireless module (e.g., Bluetooth™ module, WiFi module, mesh networking module) suitable for transmitting wireless signals. Furthermore, in some embodiments, the wireless temperature sensor 44 may also communicate using wired communication. In certain embodiments, the workpiece 28 may be configured to rotate during a welding operation. In such embodiments, the wireless temperature sensor 44 may be used so that temperature sensor leads do not wrap around the workpiece 28. The belts 32, 34 may be partially disposed onto the workpiece 28. For example, only a portion of the belts 32, 34 may be positioned to take temperature readings of the workpiece 28. Because of the flexibility of the belts 32, 34, the belts 32, 34 may be positioned on the workpiece 28 to provide for curved belts 32, 34 (e.g., s-curves or any other curves), and/or to encircle certain joints in use. Further, in workpieces 28 of larger sizes, the belts 32, 34 may not completely surround the larger workpiece 28 but may only take readings of certain portions of the workpiece 28. The belts 32, 34 may be additionally disposed on inside portions of the workpiece 28, such as inside of a pipe. For example, the belts 32, 34 may include magnetic layers or attachment points (e.g., magnets disposed on the belts 32, 34) suitable for magnetically attaching the belts 32, 34 onto the workpiece 28. Likewise, the belts 32, 34 may be clamped inside or outside portions of the workpiece 28.

The temperature sensor belts 32, 34 may also include a wireless transmitter/receiver system 50. The wireless system 50 may receive indications that correspond to temperatures from the temperature sensors 36 and 44 coupled to the temperature sensor belts 32, 34. The wireless system 50 may be electrically coupled to the temperature sensors 36, 44 of the temperature sensor belts 32, 34 and/or receive wireless signals from the wireless temperature sensors 44 of the temperature sensor belts 32, 34. In certain embodiments, the wireless system 50 may include a battery to power the temperature sensors 36, 44. The wireless system 50 provides wireless signals 52 that may be received by the data receiver 40. As may be appreciated, by using the temperature sensor belts 32, 34, temperatures of the workpiece 28 may be detected and/or monitored. Accordingly, a quality of a weld performed on the joint 30 may be determined and/or controlled.

FIG. 3 is a cross-sectional view of an embodiment of the temperature sensor belts 32, 34. The temperature sensor belts 32, 34 may include an insulative layer 54. The insulative layer 54 is configured to thermally insulate one or more sides of the temperature sensors 36, 44 that are not arranged to contact the workpiece 28, such as to insulate the temperature sensors 36, 44 from direct heat produced by a welding operation. In certain embodiments, the insulative layer 54 may be configured to protect the temperature sensors 36, 44 and/or improve the accuracy of detected temperatures. The insulative layer 54 may be formed from any suitable material, such as a polymer based material, a cloth, a fabric, and so forth. In the illustrated embodiment, connectors 56 are disposed in the insulative layer 54 to facilitate electrically coupling temperature sensor leads 58 to the temperature sensors 36. Furthermore, the temperature sensor leads 58 are disposed in the insulative layer 54. The temperature sensor belts 32, 34 may include a connector 60 that couples the temperature sensor leads 58 to the wireless system 50. As illustrated, the wireless system 50 may communicate wirelessly using the wireless signals 52 and/or the wireless system 50 may communicate using a wired connection coupled to the wireless system 50 via a connector 62. Accordingly, the leads 58 may be communicatively coupled to an external device, such as to the power supply 12. In one embodiment, the connector 62 may be a 90° connector to facilitate coupling to the external device. In other embodiments, the connector 62 may be angled at any angle, including parallel to the belts 32, 34.

The temperature sensor belts 32, 34 may include a support layer 64 configured to provide support to the insulative layer 54 and/or the temperature sensors 36, 44. In certain embodiments, the support layer 64 may include a protective material to protect the insulative layer 54 and/or the temperature sensors 36, 44 from abrasion and impact with welding spatter and/or other objects. The support layer 64 may be formed from any suitable material, such as a flexible material, a metal, a metal alloy, a heat resistive material, a polymeric material, and so forth. For example, in certain embodiments, the support layer 64 may be formed from a braided metal (e.g., braided copper). The temperature sensor belts 32, 34 may also include indicators 66 which may be disposed on a side of the support layer 64 opposite the temperature sensors 36, and that may receive an indication (e.g., visual and/or audio indication) representative of the temperature of the workpiece 28 from the temperature sensors 36 via leads 68. The visual indicators 66 may provide a visual indication of a temperature or feedback relating to a temperature, such as via a digital display. Furthermore, in certain embodiments, the visual indicators 66 may each include one or more light-emitting diodes (LEDs) configured to illuminate when a threshold temperature is passed (e.g., when the temperature is greater than 300 degrees Celsius, when the temperature is less than 350 degrees Celsius, etc.). As may be appreciated, the threshold temperature may be set by an operator, such as using the data receiver 40, the wireless system 50, via setting on the sensors 36, 44 (e.g., jumper settings) and so forth. The indication devices 66 may also be disposed on the power supply 12. Accordingly, the power supply 12 may additionally or alternatively indicate to the operator 18 if the operation on the workpiece 28 is proceeding as desired (e.g., at the desired temperature).

While FIG. 3 shows two layers 64 and 54, it is to be understood that the belts 32, 34 may include other layers 64, 54. For example, additional protective layers 64 may be disposed on top of layer 54, below layer 54, or between layer 54. Likewise, multiple insulation layers 54 may be used. For example, in certain embodiments, there could be an insulation layer 54 followed by a protective layer 64 followed by another insulation layer 54 followed by another protective layer 64, and so on. Multiple layers 54 may be stacked on top of each other, and similarly, multiple layers 64 may be stacked on top of each other. In short, various combinations of layers 54 and 64 may be used. It is also to be noted that the insulation layer 54 may only partially insulate the sensors 36. For example, the layer 54 may be disposed to partially surround the sensors 36 rather than completely surround the sensors 36. In other example, the layer 54 may only insulate a portion of the sensors 36, such a side of the sensors 36 or a portion of the side of the sensor 36. It is also to be noted that multiple layers 64 and 54 may each include different materials. For example, one protective layer 64 may include metal while another protective layer 64 may include Kevlar™. Likewise, one layer 54 may include Nomex™ while another layer 54 may include a polymeric composition.

The temperature sensors 36, 44 may be positioned at predetermined locations along the temperature sensor belts 32, 34. For example, the temperature sensors 36, 44 may be positioned (e.g., evenly spaced) at intervals such as every 15, 30, 45, 60 cm, or any other distance. Furthermore, in some embodiments, a position of the temperature sensors 36, 44 may be adjustable. Moreover, in certain embodiments, the temperature sensors 36, 44 may be positioned to be located around a circular pipe at intervals such as every 10, 30, or 90 degrees (e.g., 12:00, 3:00, 6:00, 9:00 positions as viewed on a clock face). Accordingly, the temperature sensor belts 32, 34 may be manufactured for a specific sized pipe, or the temperature sensor belts 32, 34 may be adjustable. For example, the temperature sensor belts 32, 34 may include a portion with hook and loop fasteners (e.g., Velcro™ portion), a locking portion, and/or a buckle portion used to adjust the size of the temperature sensor belts 32, 34.

Figure 4:
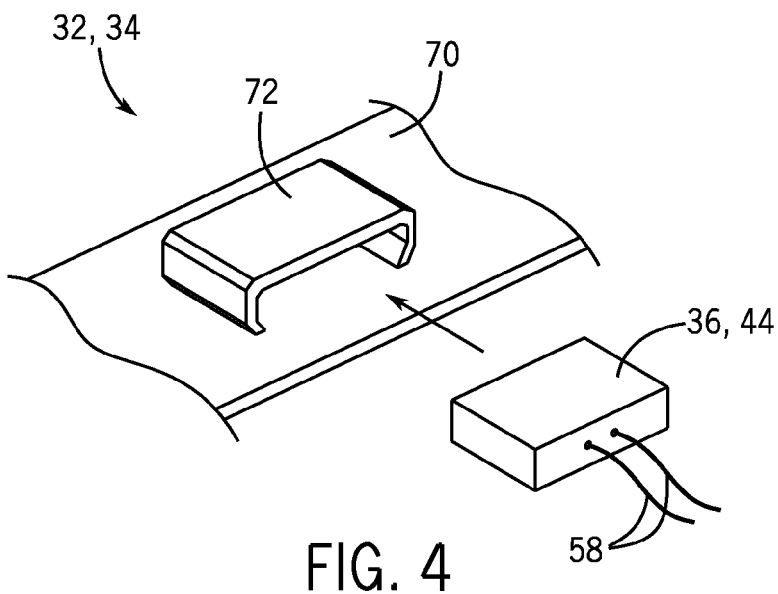
FIG. 4 is a perspective view of an embodiment of a temperature sensor belt with a housing for a temperature sensor, in accordance with aspects of the present disclosure.

FIG. 4 is a perspective view of an embodiment of the temperature sensor belts 32, 34 with a housing for a temperature sensor. The temperature sensor belt 32 includes a band 70, which may be formed from a support material, a flexible material, a metal, or a high temperature polymer, for example. A temperature sensor housing 72 may be formed in (e.g., stamped, molded, brazed, riveted, etc.) the band 70 so that the temperature sensors 36, 44 may be inserted into and/or removed from the housing 72 (e.g., removable and replaceable sensor embodiments). The housing 72 may be formed to enable the temperature sensors 36, 44 to directly contact the workpiece 28 when the temperature sensor belts 32, 34 are attached to the workpiece 28, or the temperature sensors 36, 44 may detect temperatures conducted through the housing 72. That is, the housing 72 may be positioned, in use, to contact the workpiece 28. In certain embodiments, the housing 72 may enable detection of temperatures without the temperature sensors 36, 44 contacting the workpiece 28 (e.g., in embodiments where the sensors 36, 44 include an infrared sensor suitable for detecting temperature through infrared radiation transmitted from the workpiece 28). Accordingly, in infrared sensor 36, 44 embodiments, the housing 72 may include one or more openings disposed on a wall of the housing 72 abutting the workpiece 28 when in use, to enable the passage of infrared radiation into the sensors 36, 44. Furthermore, the housing 72 may function as a support layer and/or an insulative layer. In certain embodiments, the housing 72 may be manufactured to include a support layer separate from an insulative layer. Using the temperature sensor belts 32, 34, temperatures of the workpiece 28 may be detected and/or monitored. Accordingly, a quality of a weld performed on the joint 30 may be determined and/or controlled.

Figure 5:
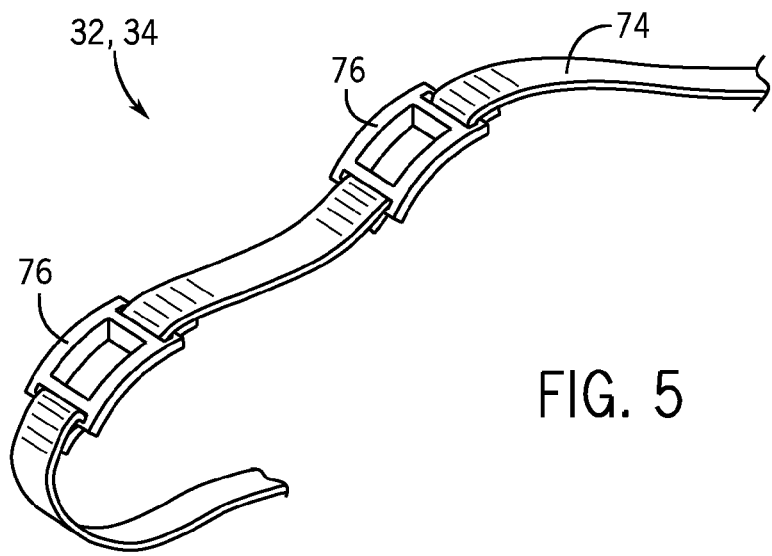
FIG. 5 is a perspective view of another embodiment of a temperature sensor belt with a housing for a temperature sensor, in accordance with aspects of the present disclosure.

FIG. 5 is a perspective view of another embodiment of the temperature sensor belts 32, 34 with a housing for a temperature sensor. The temperature sensor belts 32, 34 may include a strap 74 (e.g., support material, flexible material), such as an elastic strap, a strap having hook and loop fasteners (e.g., Velcro™ strap), a cloth strap, or any other suitable strap. Temperature sensor housings 76 are threaded onto the strap 74 and configured to hold temperature sensors 36, 44. The sensor housings 76, due at least in part to the threading technique used to mount the housings 76 onto the strap 74, may be repositionable housings 76. For example, the welding operator 18 may reposition the housings 76 closer or further apart depending on the desired application (e.g., welding, cutting, grinding, induction heating, testing, and so forth). The housings 76 may also be removed from or added to the strap 74, as desired, to incorporate more or less temperature sensor readings for a particular application.

Figure 6:
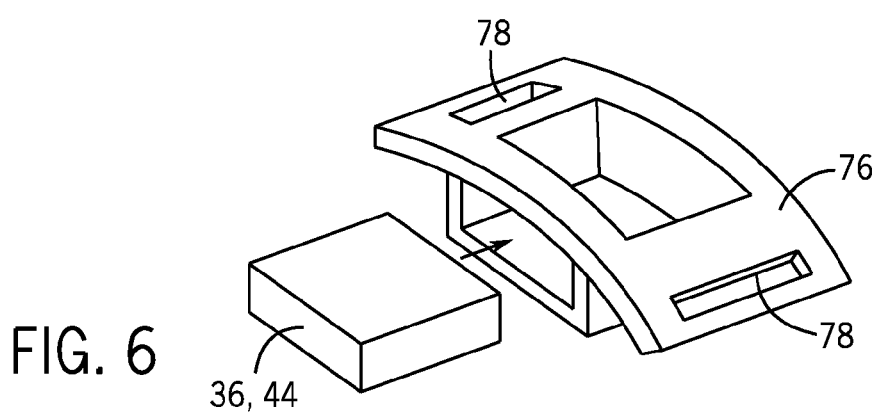
FIG. 6 is a perspective view of an embodiment of the housing of FIG. 5 having a temperature sensor inserted therein, in accordance with aspects of the present disclosure.

FIG. 6 is a perspective view of an embodiment of the housing 76 of FIG. 5 having the temperature sensors 36, 44 inserted therein. As illustrated, the housing 76 includes openings 78 that enable the strap 74 to be threaded therethrough. As may be appreciated, the housing 76 may be formed from a metal (e.g., via stamping, CNC machining, molding) or a high temperature polymer (e.g., via molding).

In one embodiment, the housing 76 may be formed to enable the temperature sensors 36, 44 to directly contact the workpiece 28 through an opening 80 when the temperature sensor belts 32, 34 are attached to the workpiece 28. In other embodiments, the temperature sensors 36, 44 may detect temperatures conducted through the housing 76 (e.g., through thermal conduction or thermal convection) or optically transmitted through the opening 80 (e.g., through infrared radiation) in the housing 76. Furthermore, the housing 76 may function as a support layer and/or an insulative layer. That is, by cradling the sensor 36, 44 as illustrated, the housing 76 may support the sensor 36, 44 and may also insulate the sensor 36, 44. In certain embodiments, the housing 76 may be manufactured to include a support layer separate from an insulative layer. Using the temperature sensor belts 32, 34, temperatures of the workpiece 28 may be detected and/or monitored. Accordingly, a quality of a weld performed on the joint 30 may be determined and/or controlled. Specifically, temperatures that the workpiece 28 is exposed to during the welding operation may be determined.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A temperature sensor belt comprising:
at least one temperature sensor configured to provide an indication representative of a temperature of a workpiece while a welding operation, cutting operation, grinding operation, or induction heating operation is performed on the workpiece; and
at least one removable housing into which the at least one temperature sensor is configured to be removably inserted, wherein each removable housing of the at least one removable housing comprises:
a support material configured to be disposed over the at least one temperature sensor when the at least one temperature sensor is inserted into the removable housing, wherein the support material is configured to support the at least one temperature sensor; and
an insulative material at least partially surrounding the at least one temperature sensor when the at least one temperature sensor is inserted into the removable housing, wherein the insulative material is configured to thermally insulate the at least one temperature sensor.

2. The temperature sensor belt of claim 1, wherein the at least one temperature sensor comprises at least one of an infrared sensor, a thermocouple, a bimetallic switch, a resistance temperature detector (RTD), a thermistor, a wax motor, or a combination thereof.

3. The temperature sensor belt of claim 1, wherein the support material comprises a flexible material.

4. The temperature sensor belt of claim 1, wherein the support material comprises a protective layer.

5. The temperature sensor belt of claim 1, wherein the at least one removable housing is configured to be repositioned with respect to the temperature sensor belt.

6. The temperature sensor belt of claim 1, comprising a wireless system supported by the support material and communicatively coupled to the at least one temperature sensor, wherein the temperature sensor belt is configured to communicate wirelessly via the wireless system.

7. The temperature sensor belt of claim 1, wherein the at least one temperature sensor comprises a wireless temperature sensor configured to wirelessly transmit the indication representative of the temperature of the workpiece.

8. The temperature sensor belt of claim 1, comprising at least one temperature indication device communicatively coupled to the at least one temperature sensor and configured to receive the indication representative of the temperature of the workpiece and to provide a visual indication of the temperature of the workpiece, an audio indication of the temperature of the workpiece, or a combination thereof.

9. The temperature sensor belt of claim 8, comprising a plurality of temperature sensors and a plurality of temperature indication devices, wherein each one of the plurality of temperature indication devices is communicatively coupled to each respective one of the plurality of temperature sensors.

10. The temperature sensor belt of claim 1, wherein the temperature sensor belt has a length configured to at least partially surround an external surface of the workpiece.

11. The temperature sensor belt of claim 10, wherein the workpiece comprises a pipe.

12. The temperature sensor belt of claim 1, wherein the temperature sensor belt is a length-adjustable temperature sensor belt.

13. The temperature sensor belt of claim 1, wherein the at least one temperature sensor is capable of detecting temperatures of at least 300 degrees Celsius.

14. A temperature sensor belt comprising:
   a plurality of removable temperature sensors, wherein each removable temperature sensor of the plurality of removable temperature sensors is configured to provide an indication representative of a temperature of a workpiece while a welding operation, cutting operation, grinding operation, or induction heating operation is performed on the workpiece; and
   a plurality of housings into which the plurality of removable temperature sensors are configured to be removably inserted, wherein each housing of the plurality of housings comprises:
      a first layer comprising a thermally insulative material, wherein the first layer at least partially thermally insulates a removable temperature sensor of the plurality of removable temperature sensors when the removable temperature sensor is inserted into the housing; and
      a second layer comprising a protective material, wherein the first layer is disposed between the removable temperature sensor of the plurality of removable temperature sensors and the second layer of the housing when the removable temperature sensor is inserted into the housing.

15. The temperature sensor belt of claim 14, comprising temperature sensor leads configured to be communicatively coupled to an external device.

16. The temperature sensor belt of claim 14, wherein the plurality of removable temperature sensors comprises at least one of a thermocouple, a bimetallic switch, a resistance temperature detector (RTD), a thermistor, a wax motor, and an infrared sensor.

17. The temperature sensor belt of claim 14, wherein each removable temperature sensor of the plurality of removable temperature sensors is configured to provide the indication representative of the temperature of the workpiece to a wireless transmitter.

18. The temperature sensor belt of claim 14, wherein at least one removable temperature sensor of the plurality of removable temperature sensors comprises a wireless temperature sensor configured to transmit the indication representative of the temperature of the workpiece.

19. A temperature sensor belt comprising:
   one or more temperature sensors configured to detect temperatures on a surface of a workpiece while a welding operation, cutting operation, grinding operation, or induction heating operation is performed on the workpiece; and
   a strap and one or more removable housings into which the one or more temperature sensors are configured to be removable inserted, each removable housing of the one or more removable housings comprising a support material configured to be disposed over a temperature sensor of the one or more temperature sensors, wherein the support material is configured to support the temperature sensor.

20. The temperature sensor belt of claim 19, wherein the workpiece comprises a pipe.

* * * * *